US007129924B2

United States Patent
Pai

(10) Patent No.: US 7,129,924 B2
(45) Date of Patent: Oct. 31, 2006

(54) METHOD AND CASCADING DIFFERENTIAL SIGNAL CIRCUIT FOR RECEIVING DIFFERENTIAL SIGNALS OF DATA-BUS, DRIVING CIRCUIT OF LIQUID CRYSTAL DISPLAY AND DRIVING IC

(75) Inventor: Feng-Ting Pai, Hsinchu (TW)

(73) Assignee: Hannstar Display Corp., Taipei (TW)

( * ) Notice: Subject to any disclaimer, the term of this patent is extended or adjusted under 35 U.S.C. 154(b) by 517 days.

(21) Appl. No.: 10/413,165

(22) Filed: Apr. 14, 2003

(65) Prior Publication Data

US 2004/0075636 A1    Apr. 22, 2004

(30) Foreign Application Priority Data

Oct. 22, 2002    (TW) .............................. 91124326 A

(51) Int. Cl.
*G09G 3/36* (2006.01)
(52) U.S. Cl. .................................... 345/103
(58) Field of Classification Search ................ 345/103, 345/87, 98–100
See application file for complete search history.

(56) References Cited

U.S. PATENT DOCUMENTS

2001/0013850 A1* 8/2001 Sakaguchi et al. ............ 345/87
2003/0038771 A1* 2/2003 Sunohara .................... 345/103
2003/0193350 A1* 10/2003 Chow ......................... 326/83

* cited by examiner

*Primary Examiner*—Bipin Shalwala
*Assistant Examiner*—Steven Holton
(74) *Attorney, Agent, or Firm*—Thomas, Kayden, Horstemeyer & Risley

(57) ABSTRACT

A cascading differential signal circuit. The processor outputs a differential signal. The data-bus transmits the differential signal. Each driving IC comprises a data receiving circuit, a terminal resistor, an output terminal and an analog-digital converter. The data receiving circuit is coupled to the data-bus for receiving the differential signals and encoding a digital signal. The terminal resistor is coupled to the data receiving circuit for acquiring an impedance match with the data-bus to transmit the differential signals. The output terminal is coupled to the terminal resistor for outputting the differential signals. The analog-digital converter is coupled to the data receiving circuit for converting the digital signal to an analog signal.

9 Claims, 3 Drawing Sheets

METHOD AND CASCADING DIFFERENTIAL SIGNAL CIRCUIT FOR RECEIVING DIFFERENTIAL SIGNALS OF DATA-BUS, DRIVING CIRCUIT OF LIQUID CRYSTAL DISPLAY AND DRIVING IC

BACKGROUND OF THE INVENTION

1. Field of the Invention

The present invention relates in general to a driving integrated-circuit (IC). In particular, the present invention relates to a differential signal circuit and a driving circuit of a liquid crystal display (LCD) comprising driving ICs connected in serial.

2. Description of the Related Art

FIG. 1 shows the conventional data-bus transmitting signal by differential-type signal. The processor 10 outputs differential signals to the driving ICs 14A~14C through data-bus 12. Here, the differential signals are transmitted when the input impedance and the output impedance of both sides of the data-bus match. Thus, terminal resistor 16 is utilized for obtaining impedance matching between the data-bus 12 and the processor 10.

Each driving IC is respectively connected to the data-bus 12 in parallel to receive the differential signals output from the data-bus 12. The processor 10 is the timing controller when used in a liquid crystal display (LCD). The differential signals are transformed to data signals after being received by the driving ICs 14A~14C, and the data signals are output to the data electrode driver of the LCD to drive the data electrode according to the synchronized pulses output from the data-bus 12.

FIG. 2 shows a circuit of the conventional driving IC 20. The data receiving circuit 22 transforms the data of the data-bus 12 to digital signals and outputs to the digital-analog converting circuits DAC1~DAC384. The digital-analog converters DAC1~DAC384 convert the digital signals to analog signals S1~S384, then transmit the analog signals S1~S384 to data electrode driver 24 to drive the data electrodes of the LCD 26. Here, the driving IC 20 comprising 384 channels is used as an example. The driving IC 20, however, may comprise 402, 420, or 480 channels.

The data transmitted to the driving IC from the data-bus 12, however, is video data, thus, the layout is complicated. For example, the layout of the nodes 18A~18C of the driving ICs 14A~14C and the data-bus 12 is very complicated. Thus, more layout space and potentially even more layers of IC board are required. Thus, the cost and the complication of layout increase.

In addition, the mass data lines between the driving ICs 14A~14C and the data-bus 12 complicate the layout trace, causing electromagnetic interference.

SUMMARY OF THE INVENTION

The object of the present invention is thus to provide a differential signal circuit having driving ICs connected in serial. Thus, the layout space is decreased. In addition, the cost is substantially decreased because the layers of the IC board are not necessary increased. Moreover, the electromagnetic interference decreases.

To achieve the above-mentioned object, the present invention provides a driving IC for receiving differential signals from a data-bus. The data receiving circuit is coupled to the data-bus for receiving the differential signals and encoding a digital signal. The terminal resistor is coupled to the data receiving circuit for acquiring an impedance match with the data-bus to transmit the differential signals. The output terminal is coupled to the terminal resistor for outputting the differential signals. The analog-digital converter is coupled to the data receiving circuit for converting the digital signal to an analog signal.

In addition, the present invention provides a cascading differential signal circuit. The processor outputs a differential signal. The data-bus transmits the differential signal. Each driving IC comprises a data receiving circuit, a terminal resistor, an output terminal and an analog-digital converter. The data receiving circuit is coupled to the data-bus for receiving the differential signals and encoding a digital signal. The terminal resistor is coupled to the data receiving circuit for acquiring impedance matching with the data-bus to transmit the differential signals. The output terminal is coupled to the terminal resistor for outputting the differential signals. The analog-digital converter is coupled to the data receiving circuit for converting the digital signal to an analog signal.

In addition, the present invention provides a driving circuit of a liquid crystal display. The data electrode driver outputs image data to the liquid crystal display according to analog signals. The timing controller outputs a differential signal. The data-bus transmits the differential signal. Each driving IC comprises a data receiving circuit, a terminal resistor, an output terminal and an analog-digital converter. The data receiving circuit is coupled to the data-bus for receiving the differential signals and encoding a digital signal. The terminal resistor is coupled to the data receiving circuit for acquiring an impedance match with the data-bus to transmit the differential signals. The output terminal is coupled to the terminal resistor for outputting the differential signals. The analog-digital converter is coupled to the data receiving circuit for converting the digital signal to an analog signal.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
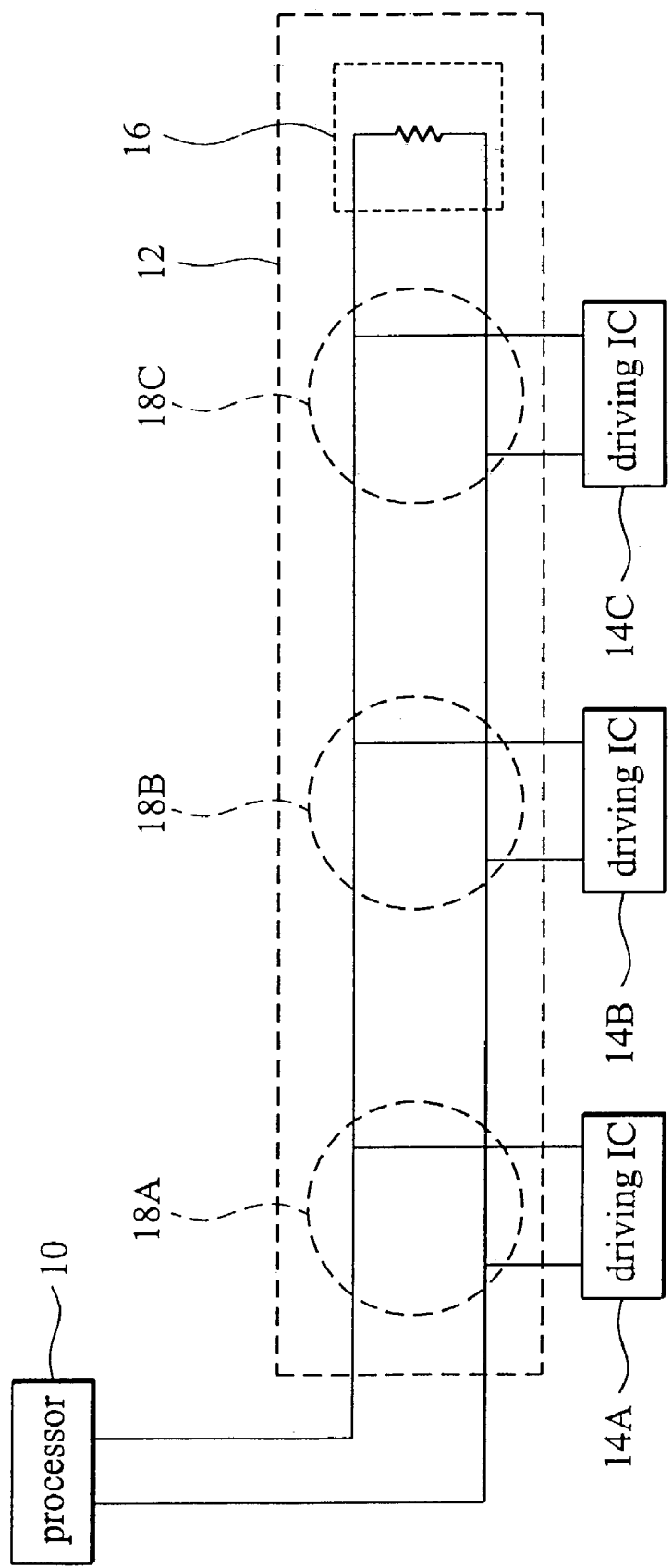
FIG. 1 shows the conventional differential type data-bus transmitting signal.
Figure 2:
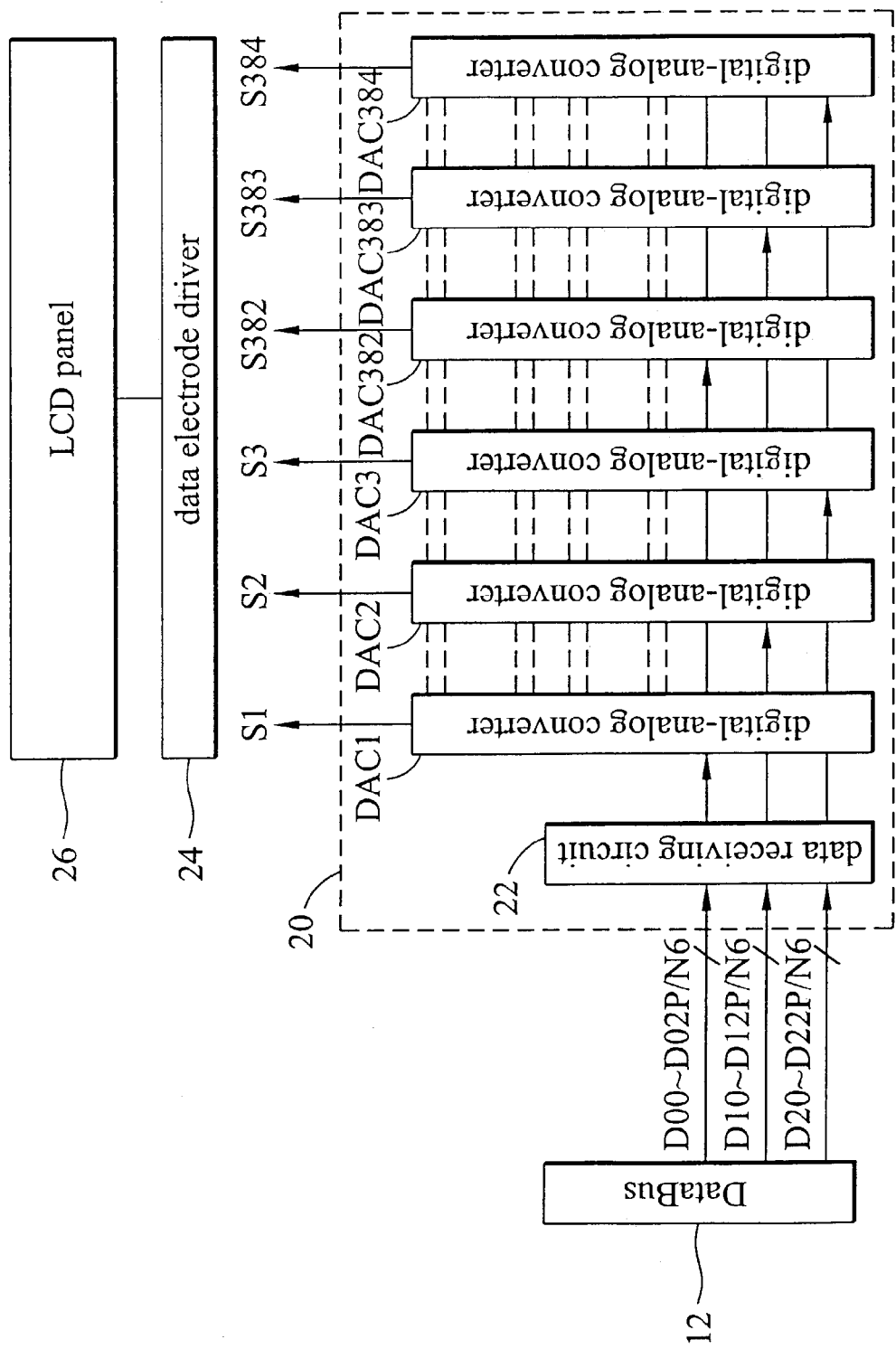
FIG. 2 shows circuit of the conventional driving IC 20.
Figure 3:
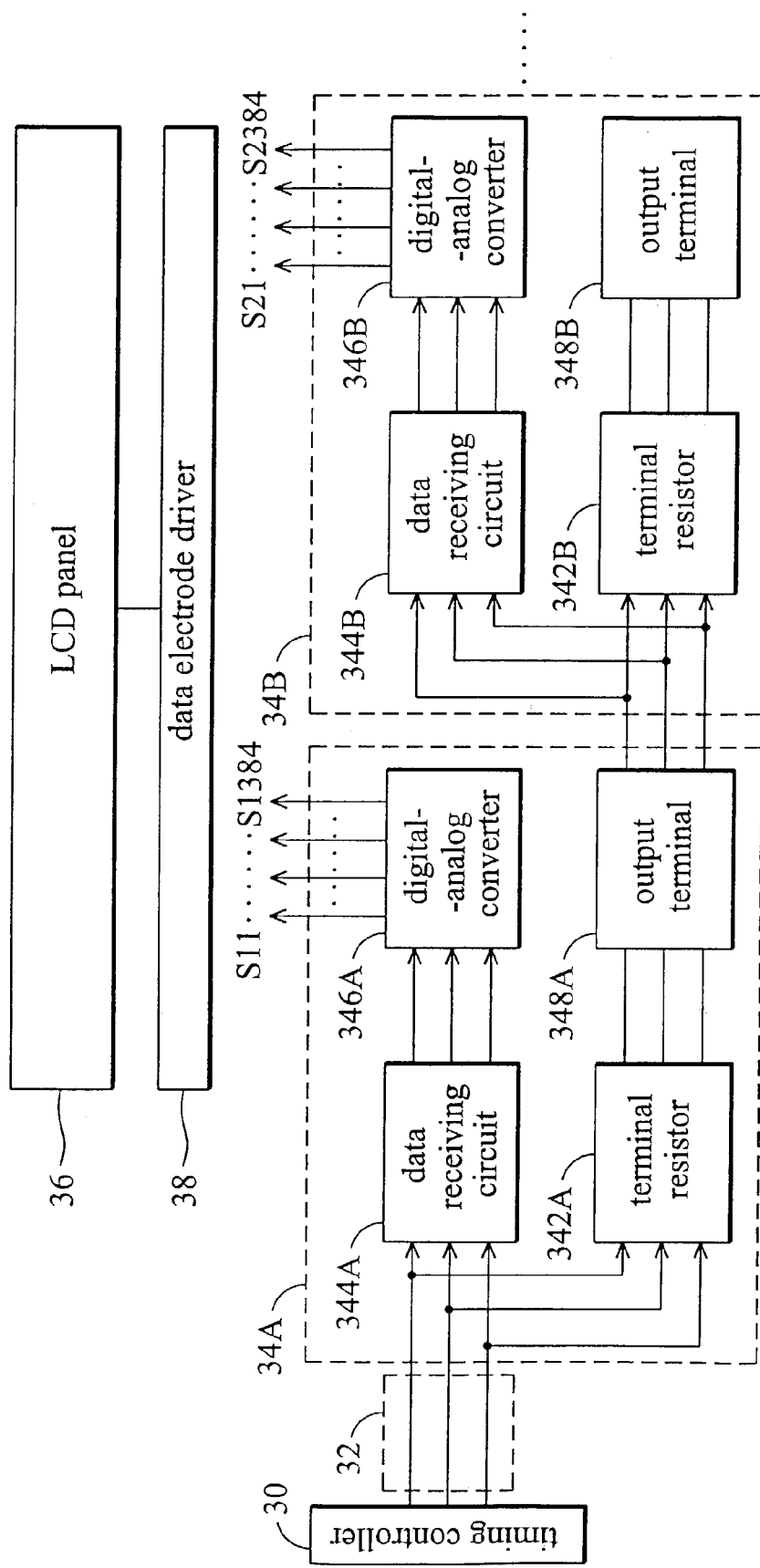
FIG. 3 shows the data-bus according to the embodiment of the present invention, which transmits differential type signals.

The cascading differential signal circuit according to the present invention is used for LCD. FIG. 3 shows the data-bus according to the embodiment of the present invention, which transmits differential type signals. The timing controller 30 outputs differential signals to the driving IC 34A through data-bus 32. Here, the differential signals are the signals of Reduced Swing Differential Signaling (RSDS) or mini-low voltage differential signaling (mini-LVDS).

The driving IC 34A comprises terminal resistor 342A connected to the timing controller 30 and acquiring an impedance match with the data-bus 32. Thus, the differential signal is transmitted when the terminal resistor 342A and data-bus 32 acquire an impedance match. The data receiving circuit 344A is coupled between the data-bus 32 and the terminal resistor 342A. The data receiving circuit 344A receives the differential signal and transforms it to digital signal. The transformed digital signal is input to the digital-analog converter 346A. After the digital-analog converter 346A converts the digital signal to an analog signal, the analog signal is output to a buffer amplifier and waits to be output. The output terminal 384A is coupled to the terminal resistor 342A for outputting the differential signals output from the timing controller 30.

The next-stage driving IC 34B comprises terminal resistor 342B connected to the output terminal 348A of the pre-stage driving IC 34A. The terminal resistor 342B acquires an impedance match with the output resistor of the output terminal 348A of the pre-stage driving IC 34A. Thus, the differential signal is transmitted successfully. The data receiving circuit 344B is coupled between the output terminal 348A of the pre-stage driving IC 34A and the terminal resistor 342B. The data receiving circuit 344B receives the differential signal and transforms it to a digital signal. The transformed digital signal is input to the digital-analog converter 346B. After the digital-analog converter 346B converts the digital signal to an analog signal, the analog signal is output to a buffer amplifier and waits to be output. The output terminal 384B is coupled to the terminal resistor 342B for outputting the differential signals output from the timing controller 30 to the next-stage driving IC.

When all the driving ICs receive the differential signal from timing controller 30 directly or indirectly, the driving ICs output the data signals S11~S1384 and S21~S2384 to the data electrode driving circuit 38 of the LCD 36 to drive data electrodes to display images.

As mentioned above, the data-bus directly connects to all driving ICs, respectively. Thus, the layout is complicated and more layout space is required, potentially requiring even more layers of IC board to avoid short connections in the layout. Thus, the cost and the complication of layout are increased. In addition, the mass data lines between the driving ICs and the data-bus cause the layout trace to be complicated and curved, so that electromagnetic interference is caused.

The differential signal circuit of the present invention avoids the disadvantages of the conventional circuit. The driving ICs are connected in serial and acquire an impedance match with each other. Only one of the driving ICs is connected to the data-bus, and the other driving ICs are between the cascading driving ICs. Thus, layout space is decreased. In addition, the cost is substantially reduced because the layers of IC board remain unchanged. Moreover, electromagnetic interference is also reduced.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A cascading differential signal circuit, comprising:
   a processor for outputting a differential signal;
   a data-bus for transmitting the differential signal; and
   a plurality of driving integrated circuit, each driving integrated circuit comprising:
      a data receiving circuit coupled to the data-bus for receiving the differential signals and encoding a digital signal;
      a terminal resistor integrated in the driving integrated circuit and coupled to the data receiving circuit for acquiring an impedance match with the data-bus to transmit the differential signals;
      an output terminal coupled to the terminal resistor for outputting the differential signals; and
      a digital-analog converter coupled to the data receiving circuit for converting the digital signal to an analog signal.

2. The cascading differential signal circuit as claimed in claim 1, wherein the processor is a timing controller.

3. The cascading differential signal circuit as claimed in claim 1, wherein the analog signal is transmitted to a liquid crystal display.

4. The cascading differential signal circuit as claimed in claim 3, wherein the liquid crystal display further comprises a data electrode driver for receiving the analog signal.

5. The cascading differential signal circuit as claimed in claim 1, wherein the differential signals are the signals of Reduced Swing Differential signaling.

6. The cascading differential signal circuit as claimed in claim 1, wherein the differential signals are the signals of mini-low voltage differential signaling (mini-LVDS).

7. A driving circuit of a liquid crystal display, comprising:
   a data electrode driver for outputting image data to the liquid crystal display according to analog signals;
   a timing controller for outputting a differential signal;
   a data-bus for transmitting the differential signal; and
   a plurality of driving integrated circuit connected in serial, each driving integrated circuit comprising:
      a data receiving circuit for receiving the differential signals and encoding a digital signal;
      a terminal resistor integrated in the driving integrated circuit and coupled to the data receiving circuit for acquiring an impedance match to transmit the differential signals;
      an output terminal coupled to the terminal resistor for outputting the differential signals; and
      a digital-analog converter coupled to the data receiving circuit for converting the digital signal to the analog signals, wherein the data receiving circuit of one driving integrated circuit is coupled to the data-bus, and the data receiving circuits of the other driving integrated circuits are coupled to the output terminal of the driving integrated circuits connected in serial.

8. The driving circuit as claimed in claim 7, wherein the differential signals are the signals of Reduced Swing Differential Signaling (RSDS).

9. The driving circuit as claimed in claim 7, wherein the differential signals are the signals of mini-low voltage differential signaling (mini-LVDS).

* * * * *